United States Patent
Nagata et al.

(10) Patent No.: US 10,347,024 B2
(45) Date of Patent: Jul. 9, 2019

(54) CONTROL LOGIC DIAGRAM CREATION SUPPORT APPARATUS

(71) Applicant: Mitsubishi Electric Corporation, Chiyoda-ku (JP)

(72) Inventors: Tomoyuki Nagata, Chiyoda-ku (JP); Koichi Nakagawa, Chiyoda-ku (JP); Shinichiro Tsudaka, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/077,545

(22) PCT Filed: Nov. 17, 2016

(86) PCT No.: PCT/JP2016/084081
§ 371 (c)(1),
(2) Date: Aug. 13, 2018

(87) PCT Pub. No.: WO2017/158926
PCT Pub. Date: Sep. 21, 2017

(65) Prior Publication Data
US 2019/0043230 A1 Feb. 7, 2019

(30) Foreign Application Priority Data

Mar. 18, 2016 (JP) .................. 2016-054807

(51) Int. Cl.
*G05B 19/05* (2006.01)
*G06T 11/20* (2006.01)
(Continued)

(52) U.S. Cl.
CPC ........ *G06T 11/206* (2013.01); *G05B 19/0426* (2013.01); *G05B 19/056* (2013.01); *G06T 11/60* (2013.01)

(58) Field of Classification Search
None
See application file for complete search history.

(56) References Cited

U.S. PATENT DOCUMENTS

| 6,987,221 B2 * | 1/2006 | Platt .................... G10H 1/0058 84/601 |
| 8,495,054 B2 | 7/2013 | Tsudaka |

(Continued)

FOREIGN PATENT DOCUMENTS

| JP | 7-311681 A | 11/1995 |
| JP | 9-91128 A | 4/1997 |

(Continued)

OTHER PUBLICATIONS

International Search Report dated Jan. 24, 2017 in PCT/JP2016/084081 filed Nov. 17, 2016.

(Continued)

*Primary Examiner* — Xin Sheng
(74) *Attorney, Agent, or Firm* — Oblon, McClelland, Maier & Neustadt, L.L.P.

(57) ABSTRACT

An apparatus includes: a similar plant information retrieval unit retrieving plant information of a similar plant similar to a creation object plant from plant information versus control logic diagram association information stored in a plant information versus control logic diagram association information storage unit; a plant information difference detector comparing the plant information of the creation object plant with the plant information of the similar plant to acquire difference information; a plant information editor that, based on the difference information, deletes an element included in the similar plant but unnecessary for the creation object plant, and retrieves an element included in the creation object plant but not included in the similar plant from the plant information versus control logic diagram association (Continued)

information storage unit to add the retrieved element; and a plant information editing result display displaying a result of the plant information editor.

3 Claims, 8 Drawing Sheets

(51) Int. Cl.
*G06T 11/60* (2006.01)
*G05B 19/042* (2006.01)

(56) References Cited

U.S. PATENT DOCUMENTS

2004/0261029 A1* 12/2004 Skjaervik ............. G06T 11/206
                                                         715/734
2012/0116561 A1    5/2012 Nakagawa
2017/0031870 A1*   2/2017 Grealish ............... G06F 17/212

FOREIGN PATENT DOCUMENTS

| JP | 2012-48651 A  |   | 3/2012  |           |
| JP | 2012-103791 A |   | 5/2012  |           |
| JP | 2012-181821 A |   | 9/2012  |           |
| JP | 2013200729 A  | * | 10/2013 | G05B 15/02 |
| JP | 2015-146117 A |   | 8/2015  |           |

OTHER PUBLICATIONS

Extended European Search Report dated Feb. 26, 2019 in European Patent Application No. 16894543.4, 8 pages.

* cited by examiner

CONTROL LOGIC DIAGRAM CREATION SUPPORT APPARATUS

FIELD

The present invention relates to a control logic diagram creation support apparatus that supports creation of control logic diagrams in which operation specifications of a plant and a device are described by flowcharts and logical operators.

BACKGROUND

Conventionally, in the development of a plant represented by a water supply and sewerage system, control logic diagrams in which an operation plan defining operation specifications of devices is described by flowcharts and logical operators have widely been used. However, in the development of a plant, hundreds of control logic diagrams are often necessary for the description, and efficient creation of them has been desired.

Patent Literature 1, which is an example of a conventional technique, discloses a logic diagram search device that searches a similar logic included in another diagram for a logic described in a control logic diagram, using logical connection information and position information of signals and computation elements in the control logic diagram, and renders a control logic having high appearance frequency as a part, thereby making it possible to improve maintainability and productivity.

CITATION LIST

Patent Literature

Patent Literature 1: Japanese Patent Application

SUMMARY

Technical Problem

However, according to the above-described conventional technique, although it is possible to create a control logic diagram using parts with high appearance frequency, a draft proposal of a control logic diagram as a raw plan has not been reached. Therefore, there has been a problem that creation of a control logic diagram is still inefficient.

The present invention has been made in view of the above circumstances, and its object is to provide a control logic diagram creation support apparatus for efficiently creating control logic diagrams.

Solution to Problem

In order to solve the above-described problem and achieve the object, the present invention provides a control logic diagram creation support apparatus comprising: a plant information input unit to input plant information representing specifications of a creation object plant and facilities included in the creation object plant in a tree structure and a control logic diagram; a plant information and control logic diagram association information storage unit to store plant information and control logic diagram association information in which each of the facilities in plant information for a plant created in the past is associated with a control logic diagram; a similar plant information retrieval unit to retrieve the plant information for the plant created in the past of a similar plant similar to the creation object plant from the plant information and control logic diagram association information stored in the plant information and control logic diagram association information storage unit; a plant information difference detection unit to compare the plant information for the creation object plant with the plant information for the plant created in the past of the similar plant to detect a difference therebetween and acquire difference information, and based on the difference information, to delete an element of a control logic diagram relating to a facility that is included in the similar plant but is unnecessary for the creation object plant; a plant information editing unit to retrieve an element of a control logic diagram relating to a facility that is included in the creation object plant but is not included in the similar plant from the plant information and control logic diagram association information storage unit, and add the retrieved element; and a plant information editing result display unit to display a result of the plant information editing unit.

Advantageous Effects of Invention

According to the present invention, it is possible to obtain a control logic diagram creation support apparatus for efficiently creating control logic diagrams.

DESCRIPTION OF EMBODIMENTS

Hereinafter, a control logic diagram creation support apparatus according to embodiments of the present invention will be described in detail with reference to the drawings. Note that the invention is not necessarily limited by these embodiments.

First Embodiment

Figure 1:
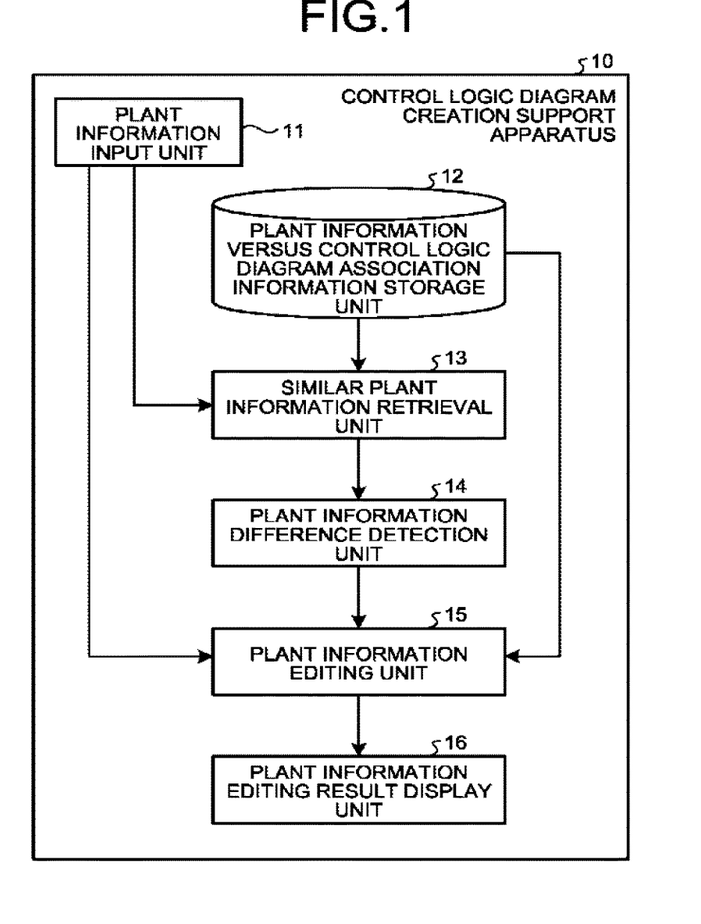
FIG. 1 is a block diagram illustrating a configuration example of a control logic diagram creation support apparatus according to a first embodiment.

FIG. 1 is a block diagram illustrating a configuration example of a control logic diagram creation support apparatus according to a first embodiment of the present invention. A control logic diagram creation support apparatus 10 illustrated in FIG. 1 includes a plant information input unit 11, a plant information versus control logic diagram association information storage unit 12, a similar plant information retrieval unit 13, a plant information difference detection unit 14, a plant information editing unit 15, and a plant information editing result display unit 16.

The plant information input unit 11 inputs plant information representing specifications of a plant and facilities included in the plant in a tree structure and control logic diagrams.

The plant information versus control logic diagram association information storage unit 12 stores elements of a control logic diagram relating to facilities and plant information versus control logic diagram association information. It should be noted that the plant information versus control logic diagram association information is information in which each facility in the plant information is associated with a control logic diagram of the facility. The plant information versus control logic diagram association information may sometimes be referred to as plant information and control logic diagram association information, and the plant information versus control logic diagram association information storage unit 12 may sometimes be referred to as a plant information and control logic diagram association information storage unit 12.

From the plant information versus control logic diagram association information of plants, which has been created in the past and stored in the plant information versus control logic diagram association information storage unit 12, the similar plant information retrieval unit 13 retrieves and acquires plant information of a similar plant similar to a creation object plant.

The plant information difference detection unit 14 compares the plant information of the creation object plant with the plant information of the similar plant for each hierarchy level to detect a difference therebetween, so as to acquire difference information accordingly. As an example, when there is a function and process level at a lower level of a request level as described later, difference information on the request level is acquired by comparing the request level of the creation object plant with the request level of the similar plant to detect the difference, and difference information on the function and process level is acquired by comparing the function and process level of the creation object plant with the function and process level of the similar plant to detect the difference.

From the difference information acquired by the plant information difference detection unit 14, the plant information editing unit 15 deletes an element of a control logic diagram relating to a facility that is included in the similar plant but is unnecessary for the creation object plant, and retrieves an element of a control logic diagram relating to a facility that is included in the creation object plant but is not included in the similar plant from the plant information versus control logic diagram association information storage unit 12 and adds it thereto.

The plant information editing result display unit 16 displays the result of the plant information editing unit 15.

Figure 2:
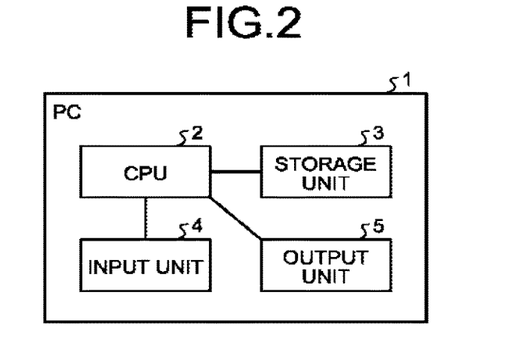
FIG. 2 is a block diagram illustrating a Personal Computer (PC) that is a configuration example of hardware for implementing the control logic diagram creation support apparatus illustrated in FIG. 1.

FIG. 2 is a block diagram illustrating a Personal Computer (PC) that is a configuration example of hardware for implementing the control logic diagram creation support apparatus 10 illustrated in FIG. 1. The PC 1 illustrated in FIG. 2 includes a Central Processing Unit (CPU) 2 that performs computations, a storage unit 3 that can store information, an input unit 4 that can input information to the PC 1, which is typified by a keyboard, and an output unit 5 that can output information from the PC 1, which is typified by a display.

The similar plant information retrieval unit 13, the plant information difference detection unit 14, and the plant information editing unit 15, illustrated in FIG. 1, are implemented by the CPU 2 using a program that is an example of information stored in the storage unit 3. The plant information versus control logic diagram association information storage unit 12 is implemented by the storage unit 3. The plant information input unit 11 is implemented by the input unit 4. The plant information editing result display unit 16 is implemented by the output unit 5. Note that the hardware for implementing the control logic diagram creation support apparatus 10 illustrated in FIG. 1 is not limited to the PC, and may be another type of computer.

Figure 3:
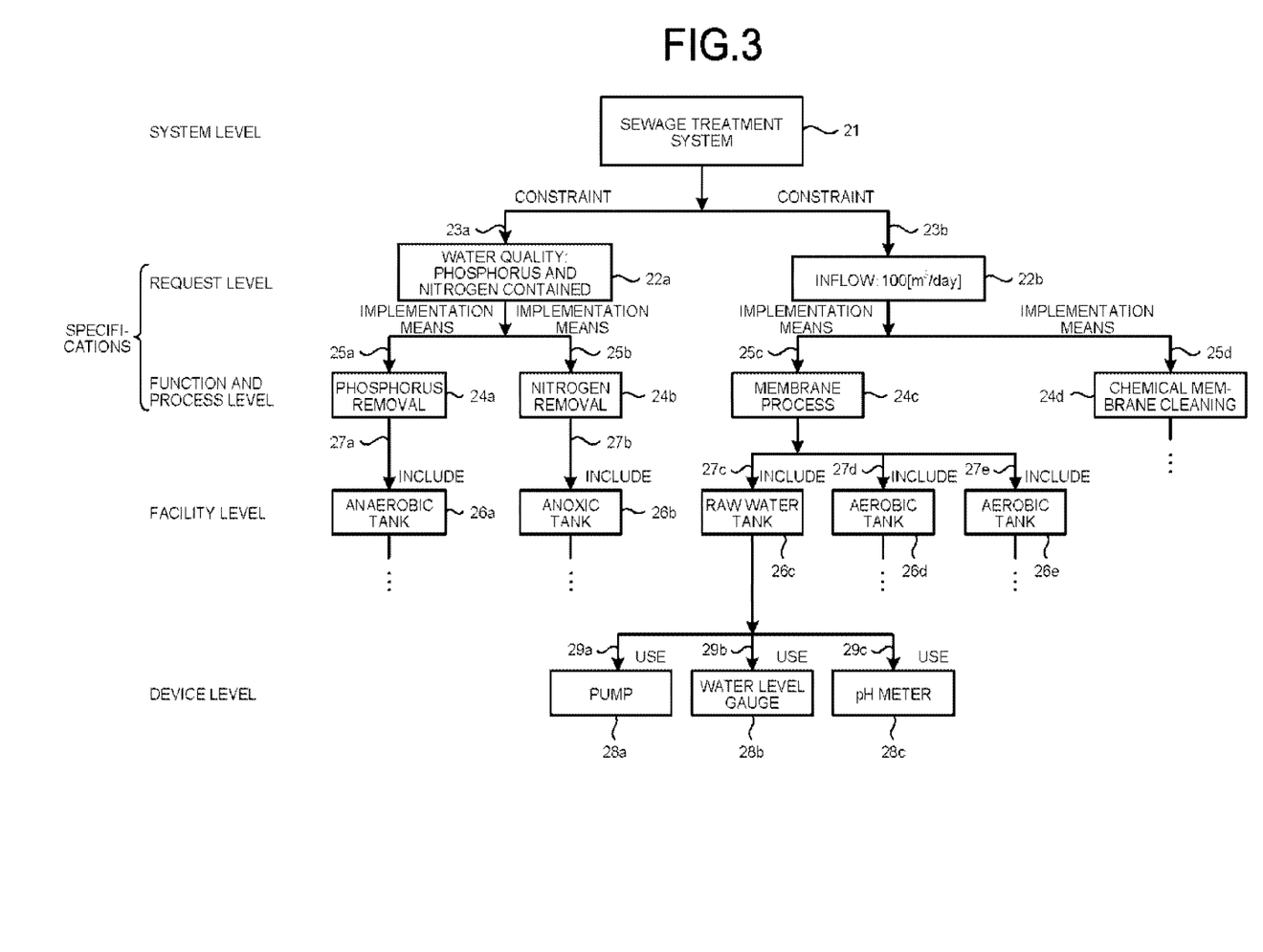
FIG. 3 is a diagram illustrating an example of plant information inputted from a plant information input unit illustrated in FIG. 1.

FIG. 3 is a diagram illustrating an example of plant information inputted from the plant information input unit 11 illustrated in FIG. 1. The plant information illustrated in FIG. 3 represents specifications of a plant and facilities included in the plant in a tree structure. At a root 21 in FIG. 3, a type of a plant system is described as a system level. In this example, "SEWAGE TREATMENT SYSTEM" is written in the root 21.

At nodes 22a and 22b, which are children of the root 21 and are at a lower level, requirements of the plant that is a system are described and specified as a request level. In this example, "WATER QUALITY: PHOSPHORUS AND NITROGEN CONTAINED" is written at the node 22a, and "INFLOW: 100 [m$^3$/day]" is written at the node 22b. At edges 23a and 23b, which are links between the root 21 and the nodes 22a and 22b, "CONSTRAINT" is written because the description contents of the nodes 22a and 22b are constraints to be satisfied.

At nodes 24a and 24b that are nodes as children of the node 22a, which are at a lower level thereof, functions and processes to be provided for the plant that is a system are described and specified as a function and process level. In this case, "PHOSPHORUS REMOVAL" is written at the node 24a, and "NITROGEN REMOVAL" is written at the node 24b. At edges 25a and 25b, which are links between the node 22a and the nodes 24a and 24b, "IMPLEMENTATION MEANS" is written because the description contents of the nodes 24a and 24b are implementation means. At nodes 24c and 24d that are children of the node 22b, functions and processes to be provided for the system are described as a function and process level. In this case, "MEMBRANE PROCESS" is written at the node 24c, and "CHEMICAL MEMBRANE CLEANING" is written at the node 24d. At edges 25c and 25d that are links between the node 22b and the nodes 24c and 24d, "IMPLEMENTATION MEANS" is written because the description contents the nodes 24c and 24d are implementation means.

At a node 26a that a node as a child of the node 24a, which is at a lower level thereof, a facility to be provided for the system is described as a facility level, and at a node 26b that is a node as a child of the node 24b, a facility to be provided for the system is described as a facility level. In this case, "ANAEROBIC TANK" is written at the node 26a, and "ANOXIC TANK" is written at the node 26b. At an edge 27a that is a link between the node 24a and the node 26a, and at an edge 27b that is a link between the node 24b and the node 26b, "INCLUDE" is written because the description contents of the nodes 26a and 26b are facilities to be included in the system.

At nodes 26c, 26d, and 26e that are nodes as children of the node 24c, facilities to be provided for the system are described as a facility level. In this case, "RAW WATER TANK" is written at the node 26c, and "AEROBIC TANK" is written at the nodes 26d and 26e. At an edge 27c that is a link between the node 24c and the node 26c, at an edge 27d that is a link between the node 24c and the node 26d, and at an edge 27e that is a link between the node 24c and the node 26e, "INCLUDE" is written because the description contents of the nodes 26c, 26d, and 26e are facilities to be included in the system.

At leaves 28a, 28b, and 28c that are children of the node 26c, devices to be provided for the system are described as a device level. In this example, "PUMP" is written at the leaf 28a, "WATER LEVEL GAUGE" is written at the leaf 28b, and "pH METER" is written at the leaf 28c. At an edge 29a that is a link between the node 26c and the leaf 28a, at an edge 29b that is a link between the node 26c and the leaf 28b, and at an edge 29c that is a link between the node 26c and the leaf 28c, "USE" is written because the description contents of the leaves 28a, 28b, and 28c are devices used by the system.

In FIG. 3, the description of children of the nodes 26a, 26b, 26d, 26e, and 24d is omitted in order to prevent the drawing from being complicated. However, it is assumed that leaves as children of the nodes 26a, 26b, 26d, 26e, and 24d are provided.

In FIG. 3, as a request of the sewage treatment system, what is required is to satisfy the constraints that nitrogen and phosphorus should be contained in the water to be treated and the inflow should be 100 [m³/day]. In addition, in order to satisfy the constraint that nitrogen and phosphorus are contained in the water to be treated, the functions and processes of phosphorus removal and nitrogen removal are included therein. An anaerobic tank is included as a facility in the function and process for the phosphorus removal, and an anoxic tank is included as a facility in the function and process for the nitrogen removal.

Figure 4:
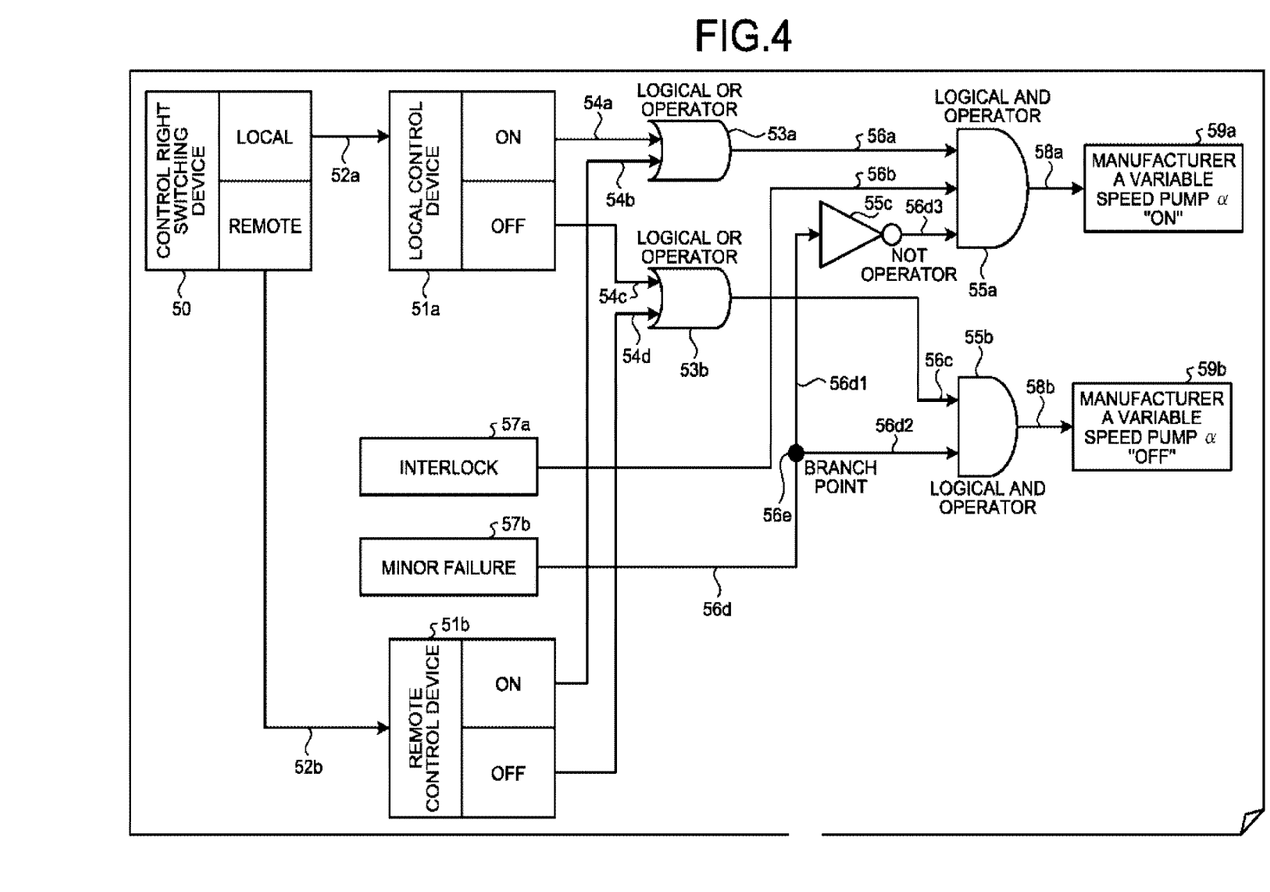
FIG. 4 is a diagram illustrating an example of a control logic diagram inputted from the plant information input unit illustrated in FIG. 1.

FIG. 4 is a diagram illustrating an example of a control logic diagram inputted from the plant information input unit 11 illustrated in FIG. 1. In the control logic diagram illustrated in FIG. 4, connections between input signals and output signals are represented by connection lines. Logical operators are represented by MIL logic symbols. In the control logic diagram illustrated in FIG. 4, there are shown a control right switching device 50, a local control device 51a, a remote control device 51b, logical OR operators 53a and 53b, logical AND operators 55a and 55b, a NOT operator 55c, an interlock 57a, minor failure 57b, manufacturer A variable speed pump α "ON" 59a, and manufacturer A variable speed pump α "OFF" 59b, which are connected by connection lines.

The "local" output of the control right switching device 50 is connected to the local control device 51a by a connection line 52a. The "remote" output of the control right switching device 50 is connected to the remote control device 51b by a connection line 52b.

The "ON" output of the local control device 51a is connected to the logical OR operator 53a by a connection line 54a. The "OFF" output of the local control device 51a is connected to the logical OR operator 53b by a connection line 54c.

The "ON" output of the remote control device 51b is connected to the logical OR operator 53a by a connection line 54b. The "OFF" output of the remote control device 51b is connected to the logical OR operator 53b by a connection line 54d.

The output of the logical OR operator 53a is connected to the logical AND operator 55a by a connection line 56a. The output of the logical OR operator 53b is connected to the logical AND operator 55b by a connection line 56c.

The output of the interlock 57a is connected to the logical AND operator 55a by a connection line 56b. The output of the minor failure 57b is branched from a connection line 56d at a branch point 56e, and connected to the NOT operator 55c by a connection line 56d1 and connected to the logical AND operator 55b by a connection line 56d2.

The output of the logical AND operator 55a is connected to the manufacturer A variable speed pump α "ON" 59a by a connection line 58a. The output of the logical AND operator 55b is connected to the manufacturer A variable speed pump α "OFF" 59b by a connection line 58b. The output of the NOT operator 55c is connected to the logical AND operator 55a by a connection line 56d3.

Note that the control logic diagram in the present invention is not limited to the example illustrated in FIG. 4, and may be any diagram or description that illustrates the relationship between input and output signals and logical operators for processing, which is represented by the Function Block Diagram (FBD) language or the Sequential Function Chart (SFC) language defined by IEC 61131-3.

Figure 5:
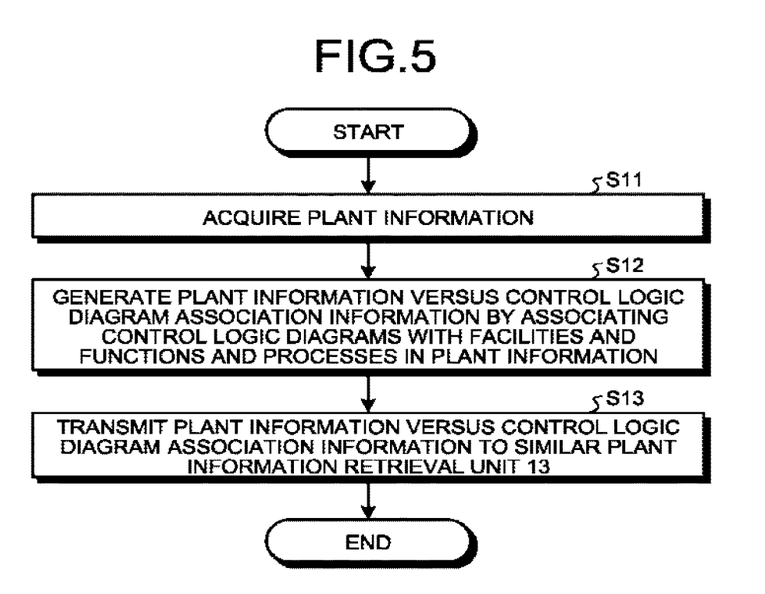
FIG. 5 is a flowchart illustrating an operation example of the plant information input unit.

FIG. 5 is a flowchart illustrating an operation example of the plant information input unit 11. First, the process is started, and the plant information input unit 11 acquires plant information (S11). Next, plant information versus control logic diagram association information is generated by associating control logic diagrams with facilities, and functions and processes in the acquired plant information (S12). Next, the plant information versus control logic diagram association information is transmitted to the similar plant information retrieval unit 13 (S13), and the process is terminated.

Figure 6:
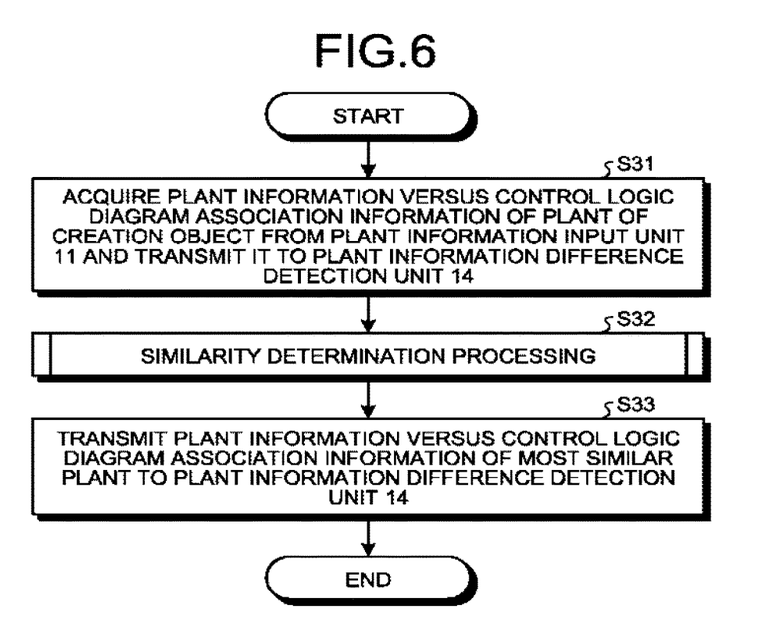
FIG. 6 is a flowchart illustrating an operation example of a similar plant information retrieval unit.

FIG. 6 is a flowchart illustrating an operation example of the similar plant information retrieval unit 13. The similar plant information retrieval unit 13 acquires the plant information versus control logic diagram association information of the creation object plant from the plant information input unit 11, and transmits it to the plant information difference detection unit 14 (S31). Next, the similar plant information retrieval unit 13 performs similarity determination processing (S32). The similarity determination processing that is in a subroutine will be described later. Next, from the results of the similarity determination processing in S32, plant information versus control logic diagram association information for a plant most similar to the creation object plant is acquired and transmitted to the plant information difference detection unit 14 (S33), and the process is terminated.

Figure 7:
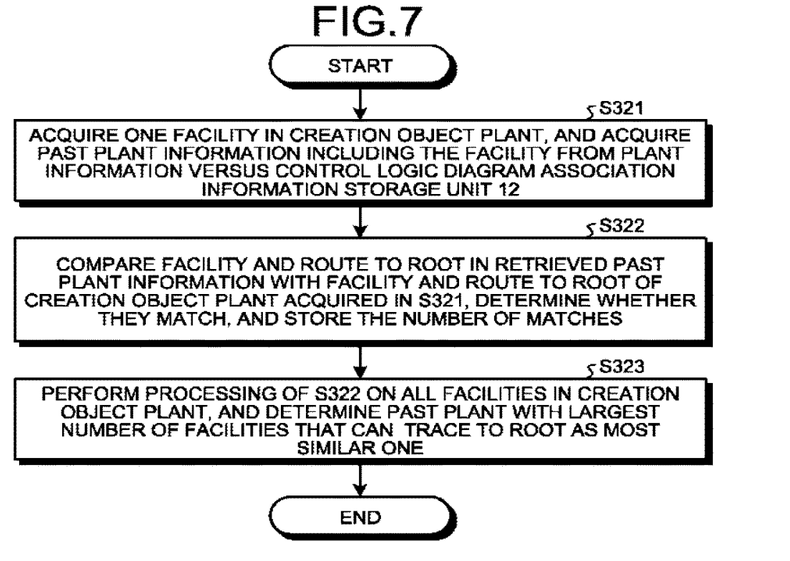
FIG. 7 is a flowchart illustrating the details of similarity determination processing illustrated in FIG. 6.

FIG. 7 is a flowchart illustrating the details of the similarity determination processing in illustrated in FIG. 6. The similar plant information retrieval unit 13 acquires one facility in the creation object plant, and acquires past plant information including the acquired facility from the plant information versus control logic diagram association information storage unit 12 (S321) Next, the similar plant information retrieval unit 13 compares the facility and the route to the root in the retrieved past plant information with the facility and the route to the root for the creation object plant, determines whether they match, and stores the number of matches (S322). Then, the processing in S322 is performed on all the facilities in the creation object plant, and a paste plant with the largest number of facilities that can trace until the root is determined as the most similar one (S323), and the process is terminated. The same processing is performed on the other facilities in the creation object plant. In this way, the similar plant information retrieval unit 13 acquires, as plant information of a similar plant, plant information that matches in facilities of the plant information inputted by the plant information input unit 11, and has the largest number of matches in specifications for the plant at higher levels of the facilities.

Figure 8:
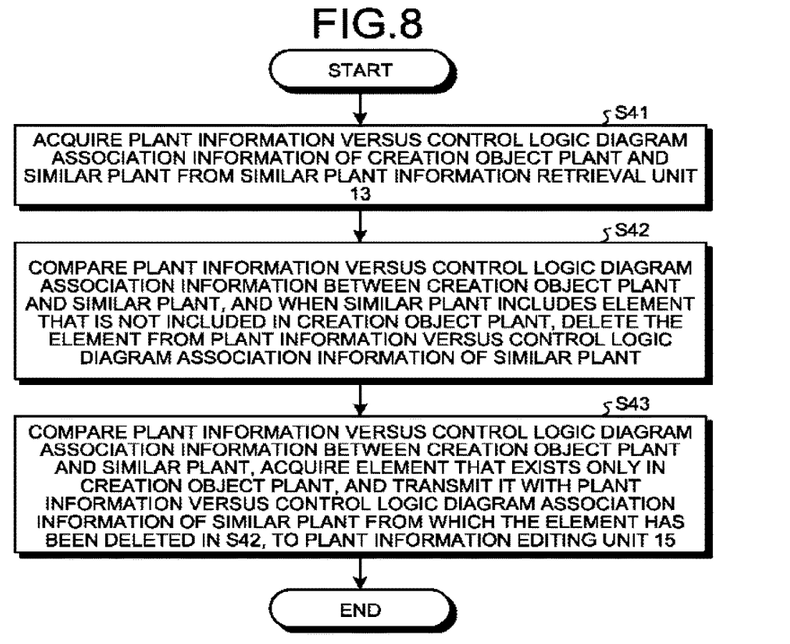
FIG. 8 is a flowchart illustrating an operation example of a plant information difference detection unit.

FIG. 8 is a flowchart illustrating an operation example of the plant information difference detection unit 14. The plant information difference detection unit 14 acquires the plant information versus control logic diagram association information of the creation object plant and the similar plant from the similar plant information retrieval unit 13 (S41). Next, the plant information difference detection unit 14 compares the plant information versus control logic diagram association information of the creation object plant with the plant information versus control logic diagram association information of the similar plant, and when the similar plant has an element, in other words, a facility, and a function and process that are not included in the creation object plant, the element is deleted from the plant information versus control logic diagram association information of the similar plant (S42). Next, the plant information difference detection unit 14 compares the plant information versus control logic diagram association information of the creation object plant with the plant information versus control logic diagram association information of the similar plant in the same manner as S42, acquires an element that exists only in the creation object plant, transmits it together with the plant information versus control logic diagram association information for the similar plant from which the element has been deleted in S42, to the plant information editing unit 15 (S43), and terminates the process.

Figure 9:
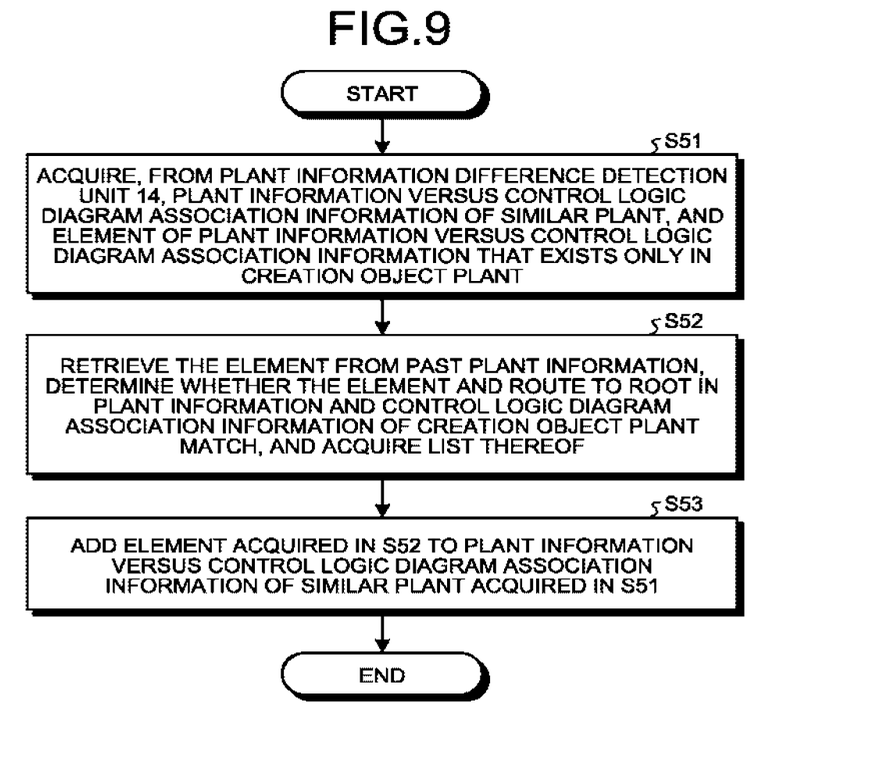
FIG. 9 is a flowchart illustrating an operation example of a plant information editing unit.

FIG. 9 is a flowchart illustrating an operation example of the plant information editing unit 15. The plant information editing unit 15 acquires, from the plant information difference detection unit 14, the plant information versus control logic diagram association information for the similar plant and the element of the plant information versus control logic diagram association information that exists only in the creation object plant (S51). Next, the plant information editing unit 15 retrieves the element in question from the past plant information, determines whether the element and the route to the root of the plant information versus control logic diagram association information of the creation object plant match, and acquires a list of the results (S52). The element acquired in S52 is added to the plant information-control logic diagram association information of the similar plant acquired in S51 (S53), and the process is terminated.

In S52, if there are two or more elements that match, they are added thereto. Also, if there are no exact matches, an element with a match closest to the root is added thereto.

According to the present embodiment, it is possible to detect a similar plant similar to a creation object plant, acquire plant information edited for excess or deficiency thereof, and construct a system with this similar plant as a draft proposal. Therefore, it is possible to construct a plant system more efficiently than before. According to the present embodiment, even a system integrator with little experience of system construction can efficiently create a control logic diagram by using the past resources in control logic diagrams.

Second Embodiment

Figure 10:
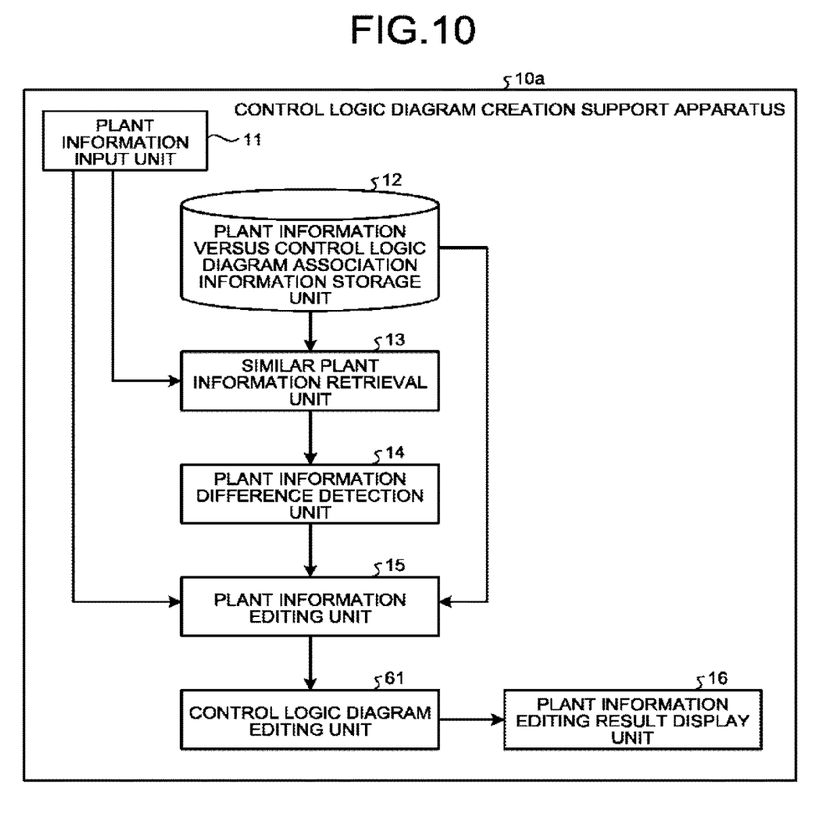
FIG. 10 is a block diagram illustrating a configuration example of a control logic diagram creation support apparatus according to a second embodiment.

FIG. 10 is a block diagram illustrating a configuration example of a control logic diagram creation support apparatus according to a second embodiment of the present invention. A control logic diagram creation support apparatus 10a illustrated in FIG. 10 has a configuration in which a control logic diagram editing unit 61 is added to the control logic diagram creation support apparatus 10 illustrated in FIG. 1. The control logic diagram creation support apparatus 10a illustrated in FIG. 10 produces a control logic diagram from the edited plant information versus control logic diagram association information for a similar plant acquired in the first embodiment, thereby making it possible to efficiently produce the control logic diagram. It should be noted that description of the same configuration and operation as in the first embodiment is omitted. The control logic diagram creation support apparatus 10a illustrated in FIG. 10 can be implemented by the PC1 illustrated in FIG. 2.

Figure 11:
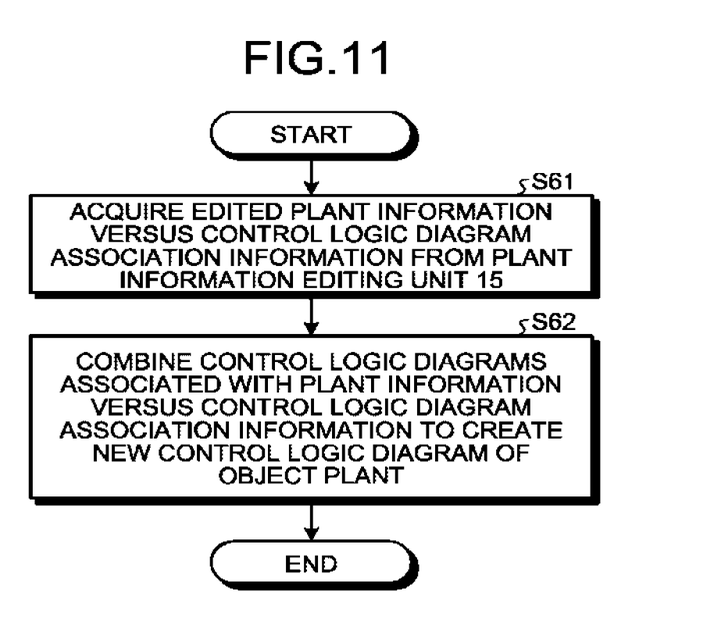
FIG. 11 is a flowchart illustrating an operation example of a control logic diagram editing unit.

FIG. 11 is a flowchart illustrating an operation example of the control logic diagram editing unit 61. The control logic diagram editing unit 61 acquires plant information versus control logic diagram association information having been edited, from the plant information editing unit 15 (S61). Then, control logic diagrams associated with the plant information versus control logic diagram association information are combined to create a new control logic diagram for an object plant (S62), and the process is terminated.

According to the present embodiment, it is possible to detect a similar plant similar to a creation object plant, and produce control logic diagrams from plant information edited for excess or deficiency thereof. With this control logic diagram as a draft proposal, a control logic diagram can be created. Therefore, it is possible to construct a plant system more efficiently than before. According to the present embodiment, even a system integrator with little experience for system construction can efficiently create a control logic diagram by using the past resources of the control logic diagrams.

The configurations illustrated in the above embodiments illustrate examples of the subject matter of the present invention, and can be combined with other publicly known techniques and partly omitted and/or modified without departing front the scope of the present invention.

REFERENCE SIGNS LIST

1 PC; 2 CPU; 3 storage unit; 4 input unit; 5 output unit; 10, 10a control logic diagram creation support apparatus; 11 plant information input unit; 12 plant information versus control logic diagram association information storage unit; 13 similar plant information retrieval unit; 14 plant information difference detection unit; 15 plant information editing unit; 16 plant information editing result display unit; 21 root; 22a, 22b, 24a, 24b, 24c, 24d, 26a, 26b, 26c, 26d, 26e node; 23a, 23b, 25a, 25b, 25c, 25d, 27a, 27b, 27c, 27d, 27e, 29a, 29b, 29c edge; 28a, 28b, 28c leaf; 50 control right switching device; 51a local control device; 51b remote control device; 52a, 52b, 54a, 54b, 54c, 54d, 56a, 56b, 56c, 56d, 56d1, 56d2, 56d3, 58a, 58b connection line; 53a, 53b logical OR operator; 55a, 55b logical AND operator; 55c NOT operator; 56e branch point; 57a interlock; 57b minor failure; 59a manufacturer A variable speed pump α "ON"; 59b manufacturer A variable speed pump α "OFF"; 61 control logic diagram editing unit.

The invention claimed is:

1. A control logic diagram creation support apparatus comprising:

a plant information input unit to input plant information representing specifications of a creation object plant and facilities included in the creation object plant in a tree structure and a control logic diagram;

a plant information and control logic diagram association information storage unit to store plant information and control logic diagram association information in which each of the facilities in plant information for a plant created in the past is associated with a control logic diagram;
a similar plant information retrieval unit to retrieve the plant information for the plant created in the past of a similar plant similar to the creation object plant from the plant information and control logic diagram association information stored in the plant information and control logic diagram association information storage unit;
a plant information difference detection unit to compare the plant information for the creation object plant with the plant information for the plant created in the past of the similar plant to detect a difference therebetween and acquire difference information, and based on the difference information, to delete an element of a control logic diagram relating to a facility that is included in the similar plant but is unnecessary for the creation object plant;
a plant information editing unit to retrieve an element of a control logic diagram relating to a facility that is included in the creation object plant but is not included in the similar plant from the plant information and control logic diagram association information storage unit, and add the retrieved element; and
a plant information editing result display unit to display a result of the plant information editing unit.

2. The control logic diagram creation support apparatus according to claim 1, wherein:
the specifications of the plant are composed of a request level to specify requirements of the plant, and a function and process level to specify function and process to be provided for the plant;
in the tree structure, a lower level of the request level is the function and process level, and a lower level of the function and process level is the facilities; and
the similar plant information retrieval unit acquires plant information that matches in the facilities of the plant information inputted by the plant information input unit and has the largest number of matches in the specifications of the plant at higher levels of the facilities, as the plant information for the similar plant.

3. The control logic diagram creation support apparatus according to claim 2, wherein the plant information difference detection unit compares the request level of the creation object plant with a request level of the similar plant to detect a difference therebetween and accordingly acquire difference information, and compares the function and process level of the creation object plant with the function and process level of the similar plant to detect a difference therebetween and accordingly acquire difference information.

* * * * *